July 10, 1962 R. E. PATTERSON 3,043,130
TUBELESS TIRE TESTING APPARATUS
Filed Sept. 22, 1958 2 Sheets-Sheet 1
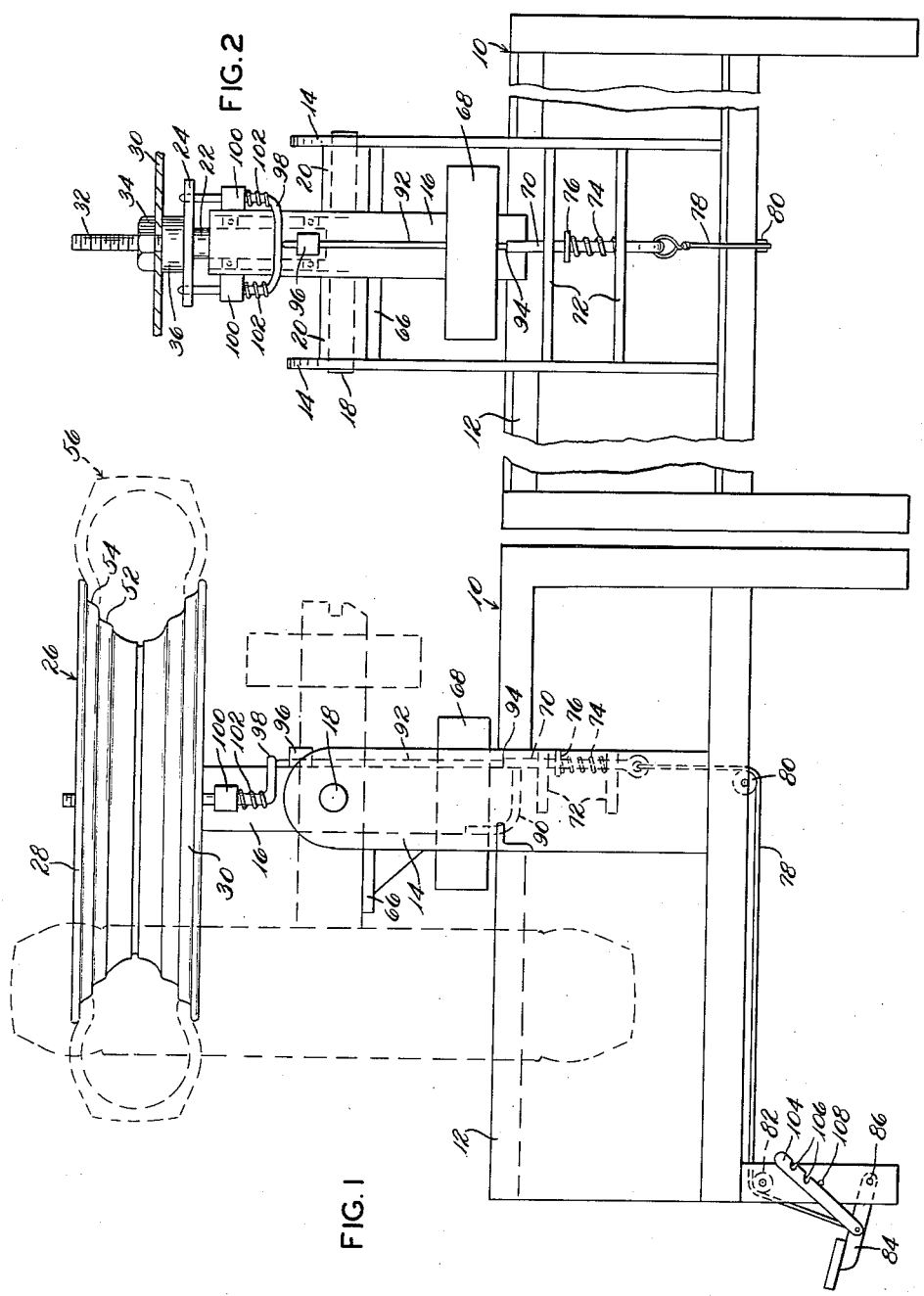
INVENTOR.
ROBERT E. PATTERSON
BY
Oldham & Oldham
ATTYS.

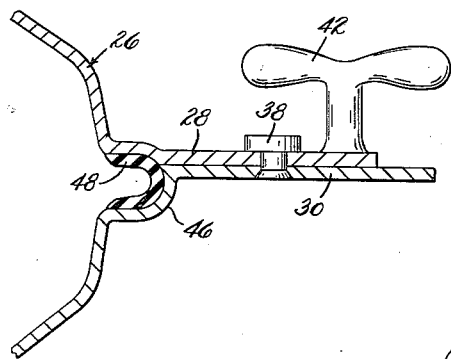
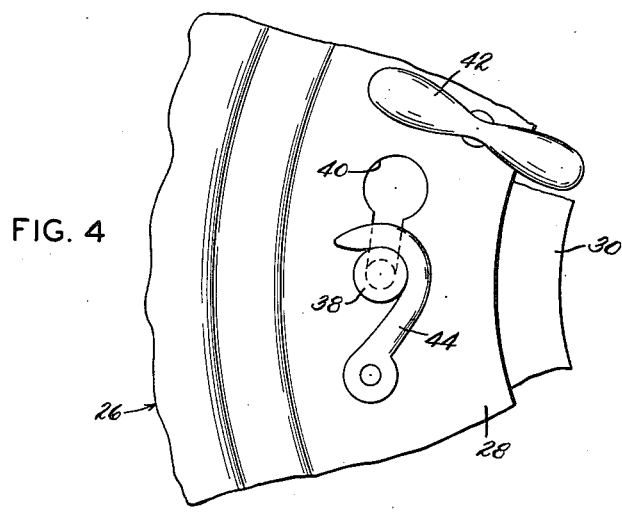
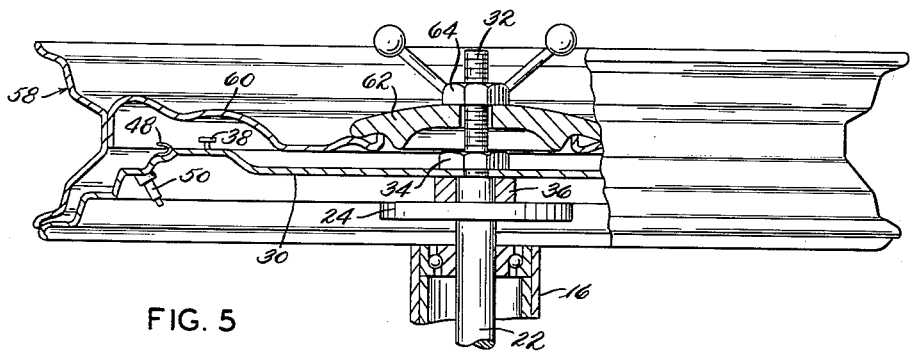
INVENTOR.
ROBERT E. PATTERSON

United States Patent Office 3,043,130
Patented July 10, 1962

3,043,130
TUBELESS TIRE TESTING APPARATUS
Robert E. Patterson, 344 Brown St., Akron, Ohio
Filed Sept. 22, 1958, Ser. No. 762,549
4 Claims. (Cl. 73—45.6)

This invention relates to tubeless tire testing apparatus, and, more particularly, is concerned with apparatus for testing the airproofness of a tubeless tire either on its regular support wheel and rim or on a special wheel.

It is the general object of my invention to provide relatively simple and inexpensive apparatus capable of being handled quickly and efficiently by the ordinary mechanic to test for airtightness of a tubeless pneumatic tire in a tank of water, the tire being mounted on a special wheel or on its regular automobile wheel.

Another object of my invention is to provide apparatus of the type described wherein the tire is mounted and demounted in a horizontal position but is supported for rotary movement in a vertical plane during testing of the tire.

Another object of my invention is the provision of apparatus of the character described which may also be utilized for mounting and demounting a tubeless tire on a conventional drop-center rim and wheel.

Another object of my invention is the provision of tire testing apparatus capable of handling tubeless pneumatic tires of a plurality of different standard sizes.

Other objects of the invention will become apparent as the description proceeds.

In the drawings:

FIG. 1 is a side elevation of one typical apparatus embodiment incorporating the principles of my invention;

FIG. 2 is an end view of the apparatus of FIG. 1;

FIG. 3 is an enlarged cross-sectional fragmentary view of the multi-part wheel incorporated with the apparatus of FIGS. 1 and 2;

FIG. 4 is a fragmentary plan view of the wheel shown in FIG. 3; and

FIG. 5 is a side elevation of a portion of the wheel and mounting shaft of the apparatus of FIG. 1, but shown on an enlarged scale, and with certain portions thereof broken away and illustrating the mounting of the conventional drop-center rim and wheel upon the support shaft of the testing apparatus.

Referring in greater detail to the drawings, the numeral 10 indicates generally a support frame made up of welded angle iron, or the like, with a tank 12 containing water being mounted at one side of the frame. Appropriately welded to the frame 10 in spaced vertical position and at the innermost side of the tank 12 are a pair of upright plates 14. Carried between the support plates 14 for movement about a horizontal axis near the upper end of the plates is a hollow tube 16, and the pivotal supporting action of the tube 16 can be achieved by the provision of a pivot pin 18 which extends between the plates 14 and through the tube 16, spacer sleeves 20 carried on the pin 18 serving to center the tube 16 midway between the plates 14.

Rotatably carried by the tube 16 and extending out of the upper end of the tube 16 is a shaft 22. FIGS. 2 and 5 illustrate a typical bearing support for the shaft 22 in the tube 16. The shaft 22 has a disc 24 welded thereto, and used as hereinafter described to hold the shaft 22 against rotation relative to the tube 16.

A wheel in one of two forms is adapted to be mounted upon the shaft 22. In one form the wheel, indicated as a whole by the numeral 26 takes the form of a circumferentially split two-part wheel having parts 28 and 30. The wheel parts 28 and 30 are substantial duplicate halves, one difference being that the wheel part 30 is formed with an integral central portion fitting down over the reduced diameter threaded portion 32 of shaft 22 and being held by nut 34 against a spacer washer 36 abutting against the disc 24. The wheel part 28 has no center portion.

The wheel parts 28 and 30 are adapted to be secured together in a quickly releasable manner, and this is conveniently achieved by bayonet joint means positioned at circumferential spaced points around the wheel parts. More specifically, headed studs or pins 38 are secured at circumferentially spaced points around the wheel part 30 and complementary key-shaped slots 40, as best seen in FIGS. 3 and 4, are provided in the wheel part 28 so that in assembling the wheel parts 28 and 30 together with the wheel part 30 in the solid line position shown in FIG. 1, the wheel part 28 is positioned over it to pass the enlarged portions of the key slots 40 over the heads of the studs 38, followed by slight rotary movement between the wheel parts to position the studs 38 down in the narrow portions of the key slots 40. This relative movement of the wheel parts 28 and 30 is usually effected with the wheel part 30 stationary, and with the wheel part 28 rotated, and such rotation of wheel part 28 can be facilitated by means of handles 42 provided at several places around wheel part 28. Once the wheel parts are in assembled relation in the form shown in FIGS. 3 and 4, a pivotally mounted hook 44 carried on wheel part 28 can be swung around to engage with the head of stud 38 if this is found necessary or desirable.

It is necessary to make the assembly between wheel parts 28 and 30 airtight, and this can be accomplished by the provision of suitable gasket means between the parts. In a preferred arrangement, wheel part 30 is formed with a cup-shaped portion 46 receiving an endless U-shaped rubber gasket 48, normally carried with the lower wheel half 30, but adapted to seal between the wheel parts when air is inflated inside of the pneumatic tire mounted on the wheel, the air being introduced through a valve 50 associated with a lower wheel part 30.

Having reference to FIG. 1, the wheel 26 has been illustrated as being formed with several sets of different diameter bead seats, for example, those indicated by the numerals 52 and 54, so as to adapt a single wheel 26 to handle several standard different diameter tubeless pneumatic tires, a typical tire being shown in dotted lines on the wheel 26 and indicated by the numeral 56. Of course, the wheel 26 can be made to handle but a single size tire, with different wheels 26 being mounted on the shaft 22 by removal of the nut 34. If the wheel 26 is provided with several different diameter bead seats, such as indicated by the numerals 52 and 54, it is normally necessary that the bead seats 54 be made a slightly greater axial distance apart than normal and the bead seats 52 be made slightly narrower in an axial distance apart than normal. Usually this does not affect the adequate seating and sealing of the tire beads and the testing of the tubeless tire.

The wheel 26 as just described is adapted to quickly and removably mount a tubeless pneumatic tire for test, the tire having been repaired. The normal procedure in repairing the tubeless pneumatic tire will be followed, namely, that of removing the tire from its standard wheel, the examination of the tire carcass, followed by plugging of a puncture in the tire, or if the tire has but a very slow leak the mounting of the tubeless tire on the wheel 26 by first removing the upper wheel half 28, the placement of the tire on the lower wheel half 30, the reassembly of the upper wheel half in locking position on the lower wheel half, the inflation of the tire by valve 50 and the tilting of the tire down into the testing tank in the manner hereinafter described.

On the other hand, it may sometimes be preferable or advisable to test the pneumatic tire on its standard automobile rim and wheel, and this can be conveniently accomplished with the apparatus of the invention in the manner shown in FIG. 5. This figure of the drawing illustrates that with the upper half 28 of the wheel 26 quickly removed it is possible to position a conventional drop-center rim 58 formed with an integral wheel disc 60 down over the lower wheel half 30, a spacing washer 62 and spanner nut 64 threaded on reduced end 32 of shaft 22 being employed to secure the wheel 60 and rim 58 in position upon the wheel part 30.

Whether the pneumatic tire to be tested is mounted on wheel 26 or on its own wheel 60 the support tube 16 can be swung about its pivot pin 18 from the full line position of FIG. 1 into the dotted line position of this figure to bring the pneumatic tire into the water in tank 12. When the tire is swung down into the tank 12 the support tube 16 is in substantially horizontal position and rests on a shelf 66 carried between the plates 14. A counterweight 68 may be mounted upon support tube 16 below the pivot pin 18 and in the manner shown in FIGS. 1 and 2 to help counterbalance the weight of the tire and its supporting wheel.

Mechanism is incorporated with the apparatus to hold the shaft 22 against rotation relative to its support tube 16, and to lock the support tube 16 in vertical position, and this will now be described. Such mechanism may include a pin 70 mounted for vertical sliding movement in a pair of plates 72 fixed between the plates 14, and with a compression spring 74 engaging between the lower plate 72 and a collar 76 fixed to the pin to normally urge the pin 70 in an upward direction to engage behind the lower end of the support tube 16 and on the side thereof remote from the tank 12. The locking pin 70 has a cable 78 secured thereto which extends downwardly around a pulley 80 and a pulley 82 on the frame 10 and is secured to a foot treadle 84 pivotally mounted at 86 on the frame 10. Thus, when the foot treadle 84 is depressed the pin 70 is pulled downwardly below the lower end of the support tube 16, and the support tube can swing from the solid line vertical position into the dotted line horizontal position to bring the tubeless tire into the tank 12. A plate 90 closes the lower end of the support tube 16 and is positioned at an angle so that in the movement of the support tube 16 back into the vertical position, as occasioned by the operator lifting the tire and wheel assembly back into the solid line position of FIG. 1, the lower end of the support tube 16 will engage with the top of the pin 70 and with a camming action push it back to the point where the tube 16 moves by the pin 70 and it snaps into locking position.

A rod 92 is slidably supported on the side of the support tube 16 remote from the tank 12, the rod being aligned with the pin 70 and normally engaging end to end therewith at point 94. The rod 92 extends slidably through a guiding hole in the counterweight 68 and slidably through a boss 96 on the back of the support tube 16. The upper end of the rod 92 engages with a U-shaped yoke 98 having roundly tapered upper ends which extend into diametrically opposed holes in the disc 24 integral with shaft 22. Bosses 100 on the sides of the upper end of the support tube 16 slidably support the yoke 98, and compression springs 102 normally urge the yoke downwardly into engagement with the rod 92 and holds the rod 92 in contact with the pin 70, but with not enough force to overcome the somewhat heavier and stronger compression spring 74.

The arrangement of the locking means described is such that when the foot treadle 84 is initially depressed the yoke 98 first moves out from engagement in the disc 24 so that the wheel and shaft is rotatable in the support tube 16, and continued downward movement of the foot treadle likewise releases the pin 70 from locking engagement with the tube end to permit the tube to tilt into the horizontal position. A locking lever 104 can be pivotally secured to the foot treadle 84, and can be provided with slots 106 and a pin 108 can be fixed to the support frame 10 whereby the foot treadle 84 can be locked in position to release the shaft 22 in relation to the support tube 16 or to release the support tube for tilting movement into the horizontal.

It is believed that the operation of my improved apparatus will be understood from the foregoing description. The mounting and testing of tubeless pneumatic tires on the two-part wheel 26 is a rapid and easy operation and is a distinct improvement on hand testing techniques now utilized. In addition, I am able to test tubeless pneumatic tires on their conventional support rims and wheels without demounting the tire from its normal rim. But should it develop, particularly after test, that it is necessary to remove the tubeless pneumatic tire from its support rim I am able to lock the rim and wheel against rotation on the support means, and to then utilize known and conventional hand lever type of tools which are run around the rim to peel the pneumatic tire from its support rim. The tire can then be repaired in known manner, remounted upon its rim, inflated, and the tire swung down by the operator to test it in the tank 12 simply by treading on the foot treadle 84 and guiding the tire with both hands down into the tank.

While in accord with the patent statutes I have specifically illustrated and described certain best known embodiments of my invention, it is to be particularly understood that I am not to be limited thereto or thereby, but that the scope of my invention is defined in the appended claims.

I claim:

1. The combination in apparatus for testing a tubeless pneumatic tire, of a circumferentially split two-part wheel adapted to mount a tubeless tire, quickly releasable means for locking the wheel parts together, gasket means for effecting a seal between the wheel parts when locked together, a shaft extending axially of the wheel and secured to one wheel part, support means for rotatably carrying the shaft in substantially vertical position, means mounting the support means on a horizontal pivot for tilting the support means and shaft into substantially horizontal position, a tank into which a tire mounted on the wheel is positioned when the support means is tilted, a weight on the support means to counterbalance the weight of the wheel and tire, quickly releasable means for locking the shaft against rotation in the support means, quickly releasable means for locking the support means in vertical position, and means for mounting a conventional tire-carrying wheel on the shaft when at least one wheel part is removed.

2. The combination defined in claim 1 including lever means connected to both the quickly releasable means for locking the shaft against rotation and the quickly releasable means for locking the support means in vertical position and so that initial movement of the lever means unlocks the first-named quickly releasable means and continued movement unlocks the second-named quickly releasable means.

3. The combination in apparatus for testing a tubeless pneumatic tire, of a circumferentially split two-part wheel adapted to mount a tubeless tire, quickly releasable means for locking the wheel parts together, gasket means for effecting a seal between the wheel parts when locked together, a shaft extending axially of the wheel and secured to one wheel part, support means for rotatably carrying the shaft in substantially vertical position, means mounting the support means on a horizontal pivot for tilting the support means and shaft into substantially horizontal position, a tank into which a tire mounted on the wheel is positioned when the support means is tilted, quickly releasable means for locking the shaft against rotation in the support means, quickly releasable means for locking the support means in vertical position, and means for mounting a conventional tire-carrying wheel on the shaft when at least one wheel part is removed.

4. Tubeless tire testing apparatus including a shaft, a wheel mounted on the shaft and adapted to carry an inflated tubeless tire, said wheel comprising circumferentially divided wheel portions each having stepped circumferential shoulders for seating a plurality of different sized tires, support means rotatably carrying the shaft, pivotal mounting means for the support means to allow movement of the shaft from substantially horizontal to substantially vetrical position, a tank containing water and positioned to receive a tire mounted on the wheel when the support means is tilted towards substantially horizontal position, releasable means for locking the shaft against rotation, and releasable means for locking the support means in substantially vertical position.

References Cited in the file of this patent

UNITED STATES PATENTS

| | | |
|---|---|---|
| 575,700 | Charbonneau | Jan. 26, 1897 |
| 2,083,326 | Eksergian | June 8, 1937 |
| 2,480,578 | Hodges | Aug. 30, 1949 |

FOREIGN PATENTS

| | | |
|---|---|---|
| 890,906 | France | Nov. 19, 1943 |
| 1,149,761 | France | July 22, 1957 |